United States Patent
Mazzer

(10) Patent No.: US 8,297,546 B2
(45) Date of Patent: Oct. 30, 2012

(54) DEVICE FOR LOCKING THE MICROMETRIC GRINDING ADJUSTMENT IN COFFEE GRINDERS

(75) Inventor: Giovanni Mazzer, Gardigiano di Scorze' (IT)

(73) Assignee: Mazzer Luigi S.R.L., Gardigiano di Scorze' (IT)

( * ) Notice: Subject to any disclaimer, the term of this patent is extended or adjusted under 35 U.S.C. 154(b) by 0 days.

(21) Appl. No.: 13/508,708

(22) PCT Filed: Nov. 17, 2010

(86) PCT No.: PCT/EP2010/067643
§ 371 (c)(1),
(2), (4) Date: May 8, 2012

(87) PCT Pub. No.: WO2011/067116
PCT Pub. Date: Jun. 9, 2011

(65) Prior Publication Data
US 2012/0228418 A1    Sep. 13, 2012

(30) Foreign Application Priority Data
Dec. 1, 2009   (IT) ............................ VE2009A0072

(51) Int. Cl.
*B02C 7/14* (2006.01)

(52) U.S. Cl. .................................. 241/259.1; 241/290

(58) Field of Classification Search ............... 241/259.1, 241/285.1, 286, 290
See application file for complete search history.

(56) References Cited

U.S. PATENT DOCUMENTS

| 2,478,937 | A | * | 8/1949 | Niethamer | 241/257.1 |
| 3,684,200 | A | * | 8/1972 | Reinhall | 241/259.1 |
| 5,564,636 | A | | 10/1996 | Mock | |
| 2004/0200912 | A1 | | 10/2004 | Park | |

FOREIGN PATENT DOCUMENTS

| DE | 1099139 | 2/1961 |
| DE | 1164040 | 2/1964 |
| DE | 4407621 | 9/1995 |
| DE | 29917567 | 12/1999 |
| EP | 1466547 | 10/2004 |
| WO | 9844836 | 10/1998 |

* cited by examiner

*Primary Examiner* — Faye Francis
(74) *Attorney, Agent, or Firm* — Themis Law

(57) ABSTRACT

A device for locking the micrometric adjustment of the degree of grinding in coffee grinders includes a hollow cylindrical casing for housing a lower grinding wheel carrier, which is connected to a motion transmission shaft, and for housing an upper grinding wheel carrier, which is axially movable; and a threaded ring nut engagable in the casing to adjust the position of the upper grinding wheel carrier, wherein the ring nut has at least one seat for inserting a peg for locking its rotation, and the casing has an undercut slot in which a slider cooperating with the peg is housed, the thickness of the slider being less than the thickness of the slot. A member engages the slider and causes it to rise and to interfere by friction with the upper wall of the slot.

10 Claims, 4 Drawing Sheets

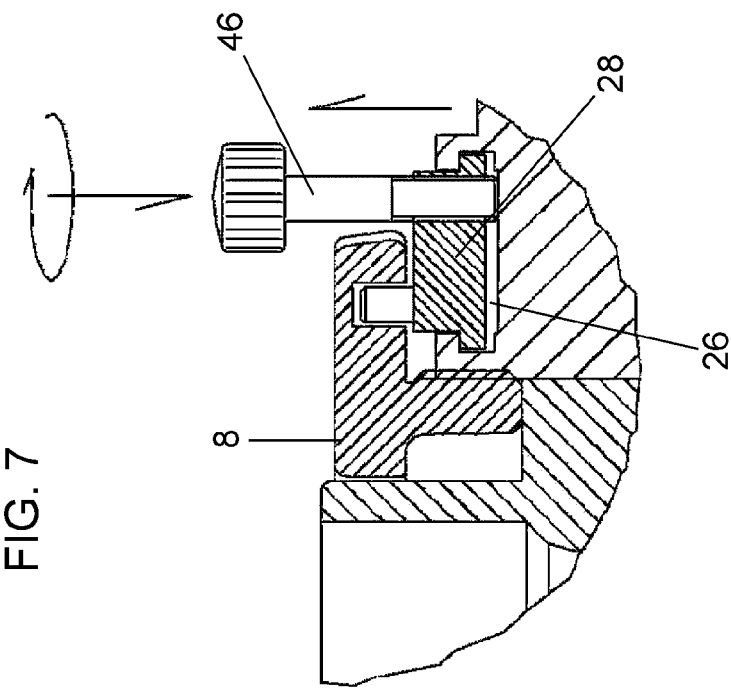
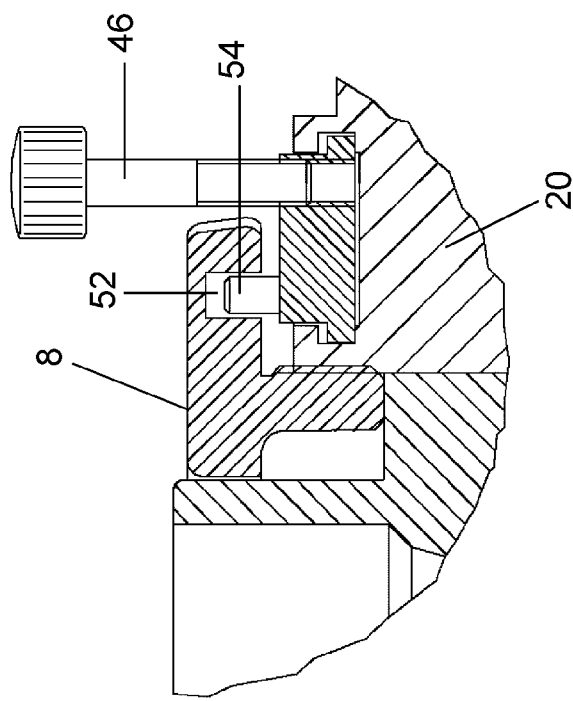

DEVICE FOR LOCKING THE MICROMETRIC GRINDING ADJUSTMENT IN COFFEE GRINDERS

FIELD OF THE INVENTION

The present invention relates to a device for locking the micrometric grinding adjustment in coffee grinders.

BACKGROUND OF THE INVENTION

Coffee grinders are known, comprising a casing housing two superposed grinding wheels, one of which is rotated by an electric motor, the other being movable axially relative to the former by operating a threaded ring nut engaging in the casing which houses the grinding wheels.

In these machines the degree of grinding is continuously adjustable by the threaded coupling, which enables the grinding wheels to be moved axially towards and away from each other, and by a system of elastic members which enable any slack arising within the connection between the constituent mechanical members of the adjustment system to be taken up.

These known adjustment systems present however the drawback that the set degree of adjustment is not always guaranteed, as the vibrations caused by the motor, the expansion of the system components caused by temperature gradients, and the thread wear caused by the passage of time and by use, cause the ring nut to move relative to the casing, with consequent variation in the degree of grinding.

To obviate these drawbacks, locking systems have been proposed consisting of a screw which causes the ring nut to engage the casing or the grinding wheel carrier.

However, if the screw engages the casing, the slack in the thread means that the ring nut loses perpendicularity to the motor axis, with consequent loss of perpendicularity to the grinding wheel carrier.

If the screw engages the grinding wheel carrier, the traction exerted by the screw causes loss of perpendicularity to the grinding wheel carrier, with consequent grinding irregularity.

Locking systems ensuring grinding wheel parallelism also exist, however these systems do not enable the degree of grinding to be adjusted continuously.

SUMMARY OF THE INVENTION

An object of the invention is to eliminate these drawbacks by providing a micrometric adjustment locking device which not only enables grinding wheel parallelism to be maintained, but at the same time enables the degree of grinding to be continuously adjusted.

This and other objects, which will be apparent from the description, are attained, according to the invention, by a device for locking the micrometric adjustment of the degree of grinding in coffee grinders as described hereinafter.

BRIEF DESCRIPTION OF THE DRAWINGS

Two preferred embodiments of the present invention are further clarified hereinafter with reference to the accompanying drawings, in which:

FIGS. 6 and 7 show a modified embodiment thereof.

DETAILED DESCRIPTION OF EMBODIMENTS OF THE INVENTION

Figure 1:
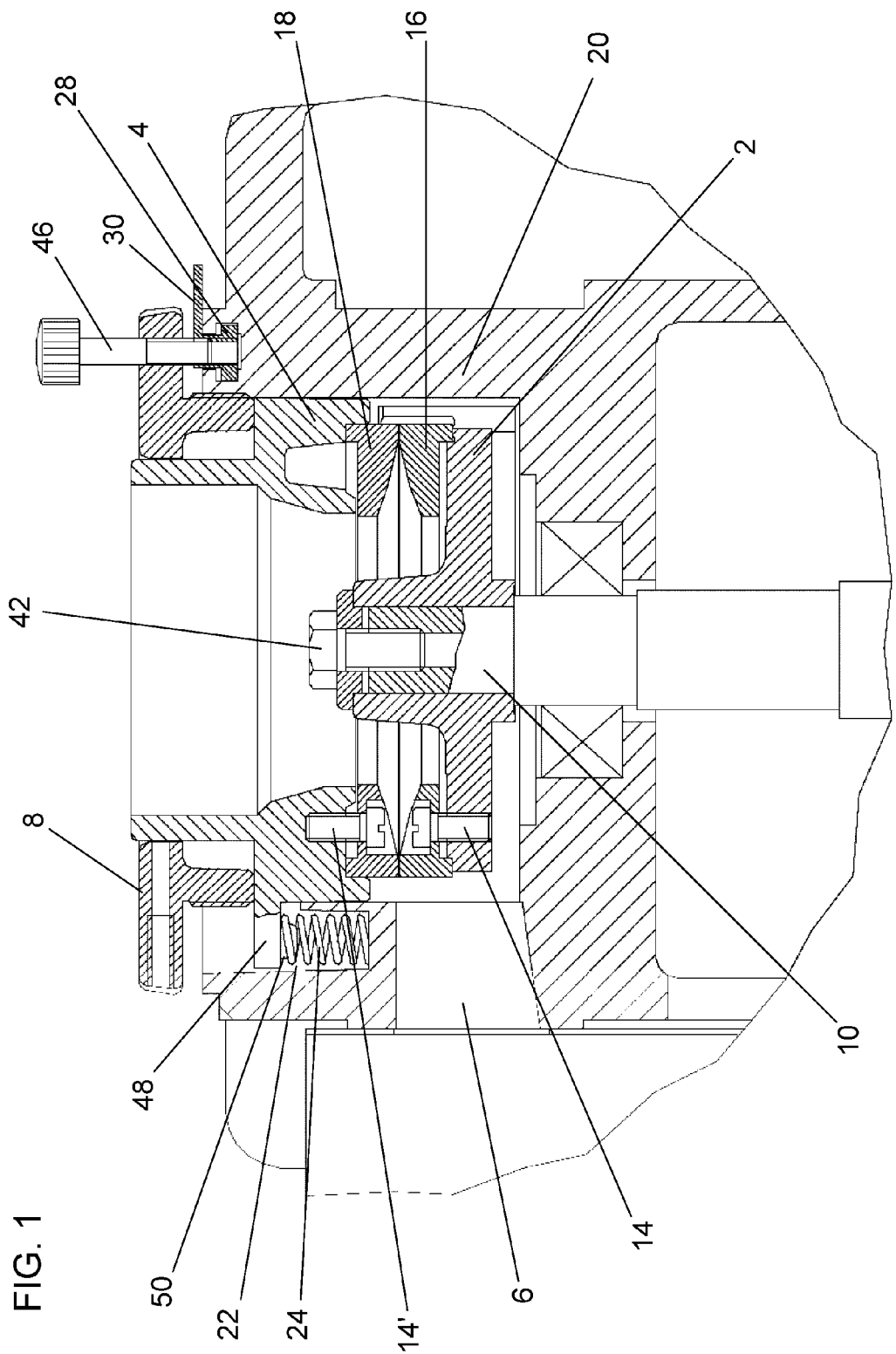
FIG. 1 is a longitudinal part section through a grinding chamber provided with an adjustment device according to the invention.
Figure 3:
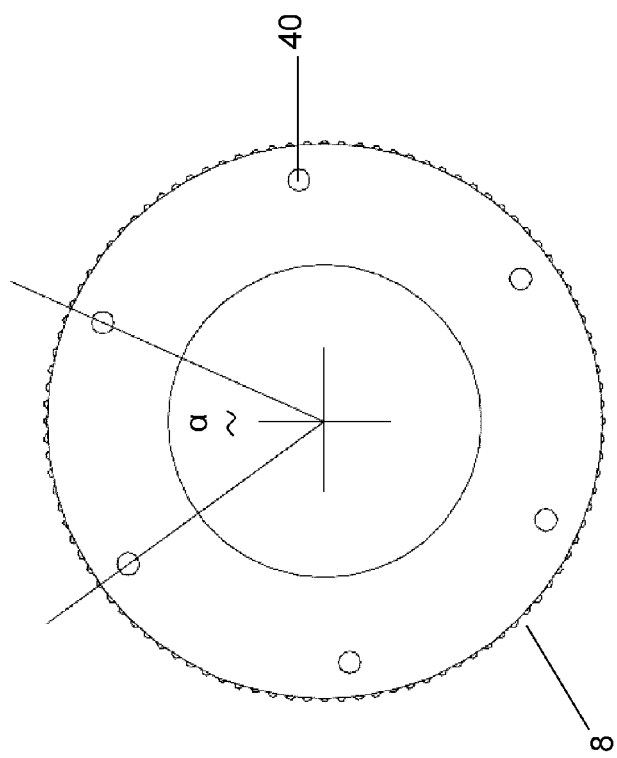
FIG. 3 is a plan view of the ring nut for micrometric adjustment.
Figure 2:
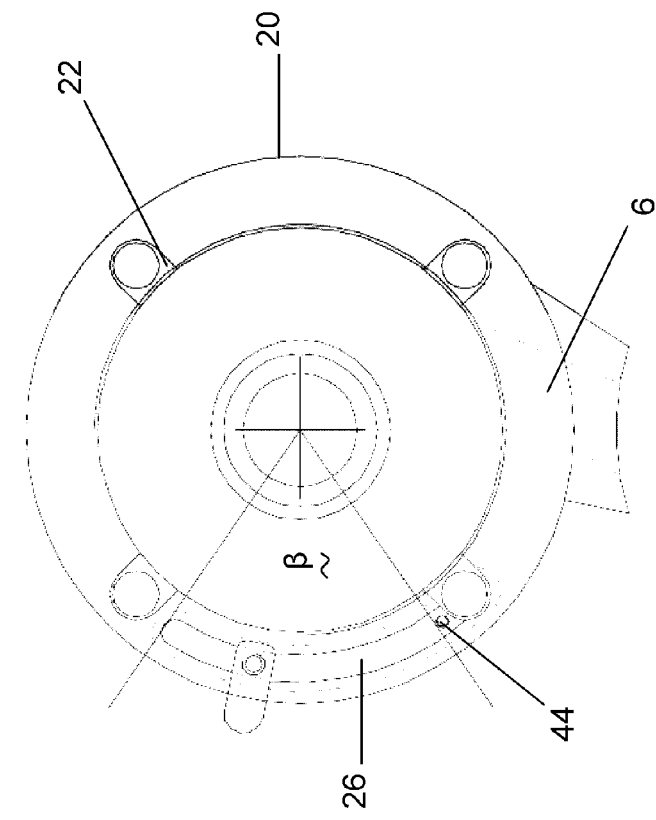
FIG. 2 is a plan view thereof.
Figure 5:
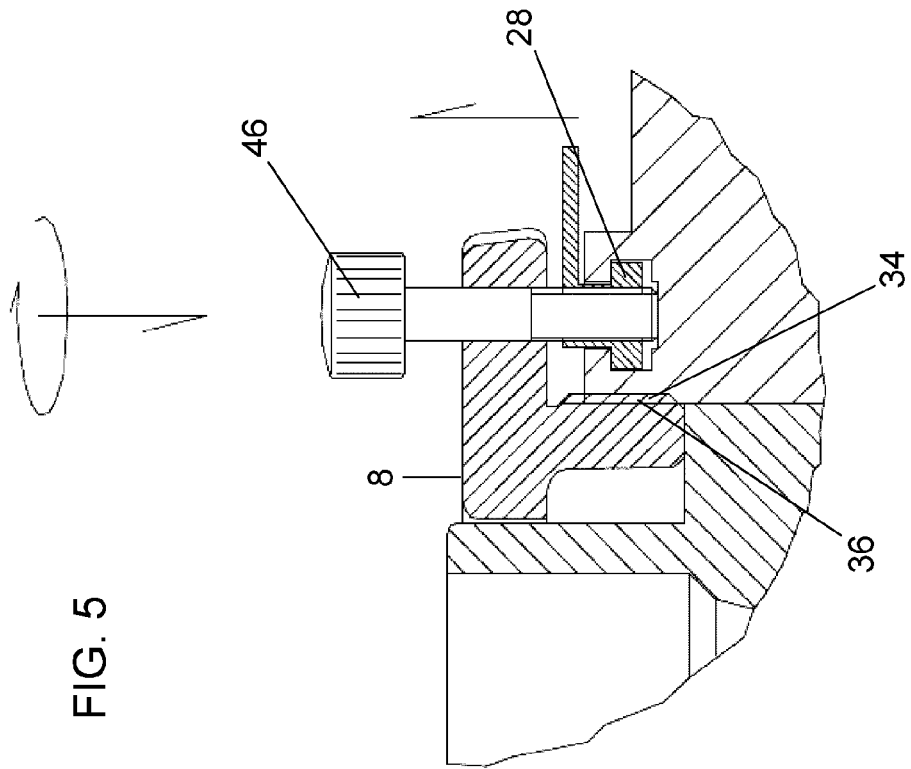
FIGS. 4 and 5 show the adjustment device of FIG. 1 in detail.
Figure 4:
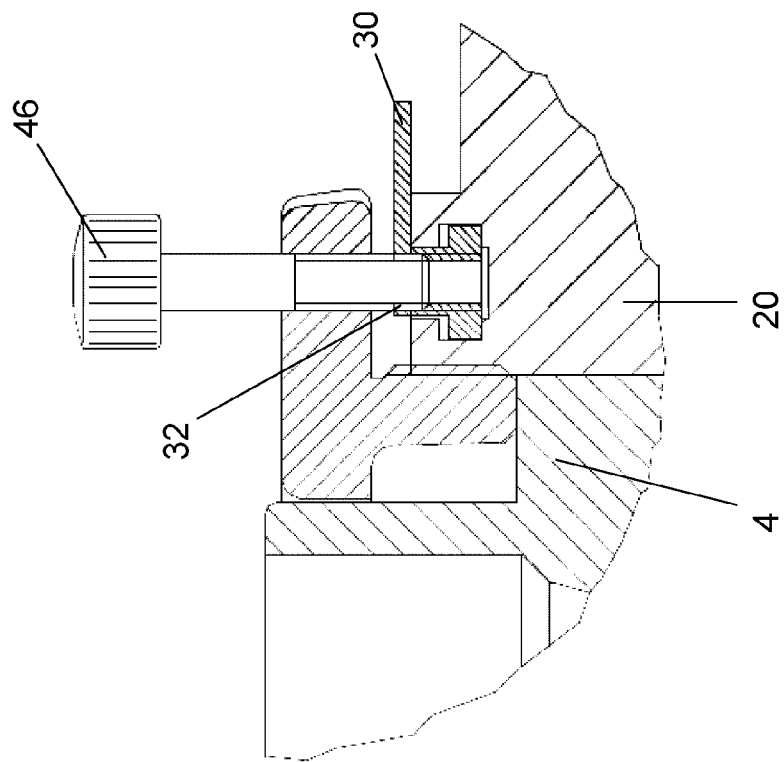

As can be seen from the figures, a micrometric adjustment locking device according to the invention comprises substantially a lower grinding wheel carrier 2, an upper grinding wheel carrier which together with the lower grinding wheel carrier 2 defines a grinding chamber, and a ring nut 8 for adjusting the upper grinding wheel carrier 4.

The grinding wheel carrier 2, to which the lower grinding wheel 16 is fixed by screws 14, rotates rigidly with the shaft 10 of an electric motor.

Likewise, the upper grinding wheel 18 is fixed to the upper grinding wheel carrier 4 by screws 14'.

The upper grinding wheel carrier 4 is provided with four equiangular radial appendices 48 provided lowerly with pegs 50.

The upper grinding wheel carrier 4 is of substantially cylindrical shape for fitting into the top a traditional cap (not shown in the drawings) for conveying coffee granules into the grinding chamber.

The upper grinding wheel carrier 4 and the lower grinding wheel carrier 2 are housed inside a hollow cylindrical casing provided with a conduit 6 for exit of the coffee powder.

The upper annular rim of the casing 20 comprises four equiangular cylindrical seats 22 for housing coil springs 24, an arc of the annular rim between two adjacent seats being provided with a curved slot 26 of inverted T cross-section.

The seats 22 are of suitable size for inserting therein the appendices 48 of the upper grinding wheel carrier 4.

The slot 26 is closed at one end and open at the other end where it is connected to a seat 22 for inserting a slider, which is also of inverted T-shape and is provided with an operating arm 30.

The thickness of the horizontal portion of the T-shaped slider 28 is less than the horizontal portion of the T-shaped slot 26.

The vertical portion of the T-shaped slider is provided with a threaded hole 32.

The upper inner surface of the casing 20 comprises a threaded portion 34 cooperating with a corresponding threaded portion 36 of the ring nut 8. The annular edge of the ring nut 8 comprises a plurality of equiangular holes 40 with the angle α less than the angle β through which the slot 26 extends.

The adjustment locking device of the invention is used in the following manner.

The drive shaft 10 is inserted into the grinding chamber and the lower grinding wheel carrier 2 is connected to the shaft by a bolt 42. The grinding wheel 16 is fixed to the lower grinding wheel carrier 2. The slider 28 is then inserted into the slot 26 through the cylindrical seat, and is prevented from withdrawal by applying a setscrew 44 into a corresponding seat provided in the slot.

The springs 24 are then inserted into the cylindrical seats 22, after which the upper grinding wheel carrier 4 is inserted with the grinding wheel 18 into the casing 20 so that the appendices 48 enter the seats 22 and the pegs 50 enter the springs 24 in order to prevent rotational movements of the upper grinding wheel carrier during grinding.

The ring nut 8 is then screwed towards the casing 20 such that the upper grinding wheel carrier 4 approaches the lower grinding wheel carrier 2. When the required level of approach between the two grinding wheels has been achieved, the slider 28 is rotated such that the hole 32 of its vertical portion faces one of the holes 40 of the ring nut 8, then a screw 46 is inserted into them such that by engaging in the threaded hole 32 of the T-shaped slider 28 it causes this to rise. Following this raising, the horizontal portion of the slider 28 engages by friction with the upper horizontal portion of the slot 26, to hence block any undesired rotation of the ring nut 8.

It should be noted that as the angle $\alpha$ is smaller than the angle $\beta$, the threaded hole 32 of the slider 28 can be made to face one of the holes 40 for any position of the ring nut.

In the embodiment illustrated in FIGS. 6 and 7, the annular rim of the ring nut is lowerly provided with a plurality of seats 52 for engaging a pin 54 rigid with the slider 28.

In this embodiment, the grinding degree adjustment is locked by rotating the ring nut 8 and positioning the slider 28 in the slot 26 such as to engage the pin 54 in the sea 52. The screw 46 is then rotated to raise the slider 28 until it interferes by friction with the upper surface of the slot 26.

The invention claimed is:

1. A device for locking micrometric adjustment of degree of grinding in coffee grinders, comprising:
    a hollow cylindrical casing housing a lower grinding wheel carrier, which is connected to a motion transmission shaft, and further housing an upper grinding wheel carrier, which is axially movable; and
    a threaded ring nut engagable in said casing to adjust a position of the upper grinding wheel carrier,
    wherein said ring nut comprises at least one seat configured for inserting a peg for locking rotation of said ring nut, and
    wherein said casing comprises an undercut slot, in which a slider cooperating with said peg is housed, the thickness of said slider being less than the thickness of said slot,
    further comprising means engaging said slider and causing said slider to rise and to interfere by friction with an upper wall of the slot.

2. The device as claimed in claim 1, wherein the ring nut comprises a plurality of equiangular seats.

3. The device as claimed in claim 2, wherein an angular width $\alpha$ between two adjacent seats of the ring nut is not greater than an angular extent $\beta$ of the slot.

4. The device as claimed in claim 1, wherein said peg is rigid with the slider and engages in a seat provided in a lower surface of the ring nut.

5. The device as claimed in claim 1, wherein said peg forms the means engaging said slider.

6. The device as claimed in claim 1, wherein the slot is of inverted T cross-section.

7. The device as claimed in claim 1, wherein the slider is of inverted T cross-section.

8. The device as claimed in claim 1, wherein the slider is provided with an operating arm.

9. The device as claimed in claim 1, wherein said seat is formed as a hole, said peg comprising a threaded screw simultaneously engaging said hole and a corresponding threaded seat of the slider.

10. The device as claimed in claim 1, wherein the casing comprises seats housing elastic means acting against the upper grinding wheel carrier.

* * * * *